United States Patent
Woods

(10) Patent No.: US 9,435,173 B2
(45) Date of Patent: Sep. 6, 2016

(54) PRODUCTION STRING PRESSURE RELIEF SYSTEM

(71) Applicant: Woods Petroleum LLC, Chester, MT (US)

(72) Inventor: Pete A. Woods, Chester, MT (US)

(73) Assignee: Woods Petroleum LLC, Chester, MT (US)

( * ) Notice: Subject to any disclaimer, the term of this patent is extended or adjusted under 35 U.S.C. 154(b) by 148 days.

(21) Appl. No.: 14/316,644

(22) Filed: Jun. 26, 2014

(65) Prior Publication Data

US 2015/0376981 A1  Dec. 31, 2015

(51) Int. Cl.
*E21B 34/08* (2006.01)
*F16K 15/04* (2006.01)

(52) U.S. Cl.
CPC .............. *E21B 34/08* (2013.01); *F16K 15/046* (2013.01)

(58) Field of Classification Search
CPC . E21B 34/08; E21B 2034/005; F16K 15/046
See application file for complete search history.

(56) References Cited

U.S. PATENT DOCUMENTS

| | | | |
|---|---|---|---|
| 568,362 A | 9/1896 | MacSpadden | |
| 2,730,115 A * | 1/1956 | Hempel | G05D 16/0641 137/217 |
| 3,516,870 A * | 6/1970 | Horn | H01M 2/1276 220/203.27 |
| 4,852,605 A * | 8/1989 | Gouhier | F16K 15/02 137/493 |
| 5,159,981 A | 11/1992 | Le | |
| 5,320,388 A * | 6/1994 | Lacy | E21B 17/00 285/353 |
| 5,564,502 A | 10/1996 | Crow et al. | |
| 5,988,691 A * | 11/1999 | Cruickshank | F16L 58/1009 285/288.1 |
| 6,354,378 B1 * | 3/2002 | Patel | E21B 21/103 166/321 |
| 6,802,791 B1 * | 10/2004 | Yoshioka | F15B 21/045 137/539 |
| 6,863,313 B1 * | 3/2005 | DeLange | F16L 58/182 285/329 |
| 7,350,565 B2 * | 4/2008 | Hall | E21B 17/003 138/137 |
| 8,561,703 B2 | 10/2013 | Mahmoud et al. | |
| 8,875,797 B2 * | 11/2014 | Aakre | E21B 34/08 166/319 |
| 2006/0027377 A1 * | 2/2006 | Schoonderbeek | E21B 34/08 166/386 |
| 2008/0029165 A1 * | 2/2008 | Beck | F16K 15/046 137/539 |
| 2010/0199982 A1 * | 8/2010 | Hansen | A61M 15/009 128/200.21 |
| 2010/0319924 A1 | 12/2010 | Mahmoud et al. | |
| 2013/0312851 A1 | 11/2013 | Andersen et al. | |
| 2014/0034326 A1 | 2/2014 | Mahmoud et al. | |

* cited by examiner

*Primary Examiner* — Shane Bomar
(74) *Attorney, Agent, or Firm* — Antoinette M. Tease

(57) ABSTRACT

A production string pressure relief system comprising a hollow cylindrical housing with an outer wall, a first relief valve assembly that is mounted on a first support base that is welded to the outer wall of the housing, and a second relief valve assembly that is mounted on a second support base that is welded to the outer wall of the housing directly opposite the first support base. Each of the first and second relief valve assemblies comprises a valve element that is in the shape of a spherical segment with a spherical sealing face, a cylindrical valve seat with a circular sealing face, and a leaf spring. The leaf spring provides a biasing force that pushes the spherical sealing face of the valve element against the circular sealing face of the valve seat to form a fluid-tight seal when the valve is in a normally closed position.

8 Claims, 5 Drawing Sheets

PRODUCTION STRING PRESSURE RELIEF SYSTEM

BACKGROUND OF THE INVENTION

1. Field of the Invention

The present invention relates to the field of pressure relief valve systems, and more particularly, to pressure relief valves for preventing excess fluid pressures in well production tubing due to a line blockage or other problem.

2. Description of the Related Art

The following terms are used in this document: biasing force is the spring force applied to the seating element of a relief valve that keeps the valve in a normally closed position. Cracking pressure is the pressure of a fluid that is sufficient to overcome the biasing force of a normally closed valve, thereby causing the valve to open. A production string is a series of connected lengths of tubing or pipe that extend from the producing zone of a well to the ground surface.

There are several examples of valves used for various purposes in oil, gas and water wells that are the subject of issued patents or pending applications, but none of these inventions includes the novel features of the present invention. The present invention is a pressure relief valve that is positioned in a production string for the purpose of bleeding off excessive fluid pressure from the inside of the production tubing in the event that the fluid pressure in the tubing rises above a preset safe level, thereby preventing tubing ruptures or other overpressure-related failures in the production system. The present invention incorporates several novel features, including a valve element positioned at the center of a biasing leaf spring with the leaf spring fixed at each end, and a thick-walled housing that provides maximum strength to resist tensile and compressive forces placed upon the valve when it is installed in a production string.

U.S. Pat. No. 8,561,703 (Mahmoud et. al., 2013) and U.S. Patent Application No. 2014/0034326 (Mahmoud et al) describe a gas-lift valve that is designed to allow a controlled volume of gas to enter the production string via the annular space between the production string and the well casing, for the purpose of reducing the density of the produced fluid and thereby increasing the production flow rate. The key feature of this invention is a valve assembly comprising multiple sealing surfaces, wherein at least one of the sealing surfaces is optimized to provide a seal under low pressure conditions, and at least one of the other sealing surfaces is optimized to provide a seal under high pressure conditions, thereby enabling the valve to provide a seal over a wide pressure range. This invention utilizes a coil spring to provide biasing force on the valve element.

U.S. Pat. No. 5,564,502 (Crow et al., 1996) describes a control valve designed to selectively allow or shut off flow within a production string. The device is typically used to allow injection of stimulation chemicals into specific zones in a multi-zone well completion. The device comprises a specialty shaped flapper valve that is normally closed across the inside diameter of the production string and that is opened by inserting a tubular member into the interior of the production string. The flapper valve element is shaped so as to closely conform to the shape of the inside diameter of the production string when the valve is opened, thereby allowing tools to be freely inserted into and withdrawn from the production string.

U.S. Pat. No. 5,139,981 (Le, 1992) describes a flapper-type check valve for controlling flow in a production string. The valve allows downward flow but blocks upward flow when closed and allows flow in both directions when open. The valve is opened by inserting a tubular member through the production string, thereby swinging the hinged flapper element downward to the inside surface of the housing. The key feature of this invention is a coil spring biasing assembly that is designed to provide a greater closing force to the valve element compared similar flapper valve devices.

U.S. Pat. No. 568,362 (MacSpadden et al., 1896) describes a check valve for pneumatic tires, footballs, and other inflatable devices. The invention comprises a flexible valve element and a flexible valve seat, both preferably comprised of sheet rubber.

U.S. Patent Application No. 2013/0312851 (Anderson et al., 2013) describes several embodiments of a low-profile valve that may be used as either a pressure relief valve or a check valve. Like the present invention, some embodiments of the Anderson invention are designed to be used in a well production string as a pressure-relief valve for venting excess fluid pressure from the interior of the production tubing to the annular space between the production tubing and the well casing. Like the present invention, the valve element and valve seat of the Anderson invention may be comprised of steel. In one of Anderson's embodiments, biasing force is supplied by the "stiffness of a rigid arm," with one end of the arm attached to the valve element and the other end of the arm attached to the housing of the device in a cantilever configuration. This arm or spring configuration is different from the both-ends-fixed configuration of the biasing spring of the present invention.

In the Anderson invention, the components are designed and assembled so as to provide a minimum outside diameter of the device, thereby optimizing the device for use in applications in which the clearance between the production string and the veil casing is very limited. The disadvantage of this type of design is that the housing walls of the device are required to be relatively thin compared to other components in the production string, thereby reducing the overall tensile and compressive strength of the string. In contrast, in the present invention, the housing walls are designed to be relatively thick and strong, while the device is designed to fit in the annular space of wells onto typical sizes of well casings and production strings.

A first object of the present invention is to provide a relief valve that may be installed in-line in a string of well production tubing, providing for the release of excess pressure that may occur in the string due to a blockage, a closed control valve or other obstruction in the string, thereby preventing damage to the tubing or other components from overpressure. A second object of the present invention is to have a sufficiently small outside diameter so that a production string incorporating the present invention can easily fit within the annular space of a well casing that is matched to the size of the production string. A third object of the present invention is to have a sufficiently large inside diameter so that tools and pump rods that are designed to slip through the interior of a particular size production string will easily slip though the interior of the present invention when installed in the production string.

BRIEF SUMMARY OF THE INVENTION

The present invention is a production string pressure relief system comprising: a hollow cylindrical housing with an outer wall; a first relief valve assembly that is mounted on a first support base that is welded to the outer wall of the housing; and a second relief valve assembly that is mounted on a second support base that is welded to the outer wall of the housing directly opposite the first support base; wherein each of the first and second relief valve assemblies comprises a valve element that is in the shape of a spherical segment with a spherical sealing face, a cylindrical valve seat with a circular sealing face, and a leaf spring. In a preferred embodiment, the leaf spring provides a biasing force that pushes the spherical sealing face of the valve element against the circular sealing face of the valve seat to form a fluid-tight seal when the valve is in a normally closed position. The sealing face of the valve seat is preferably chamfered to fit with the sealing face of the valve element.

In a preferred embodiment, the leaf spring comprises a central portion; the central portion of the leaf spring is welded into a rectangular groove in a low-pressure side of the valve element; the leaf spring comprises a first end and a second end; and each of the first and second ends of the leaf spring is attached to a pair of brackets that are welded to the support base. Preferably, each of the first and second ends of the leaf spring is rotatably attached to the pair of brackets. The support base is preferably welded to a perimeter of a cutout in the outer wall of the housing.

In a preferred embodiment, there is an internal fluid pressure within the cylindrical housing; the valve assembly has a cracking pressure; and when the internal fluid pressure is equal to or greater than the cracking pressure of the valve assembly, an opening force is exerted on the valve element that is greater than the biasing force, thereby causing the leaf spring to deflect away from the support base and the valve element to lift away from the valve seat and allowing fluid inside the housing to flow through an annular gap between the valve element and the valve seat. Preferably, the hollow cylindrical housing comprises inside walls, and the hollow cylindrical housing is structurally reinforced with two curved plates that fit against and are welded to the inside walls of the housing.

REFERENCE NUMBERS

Figure 1:
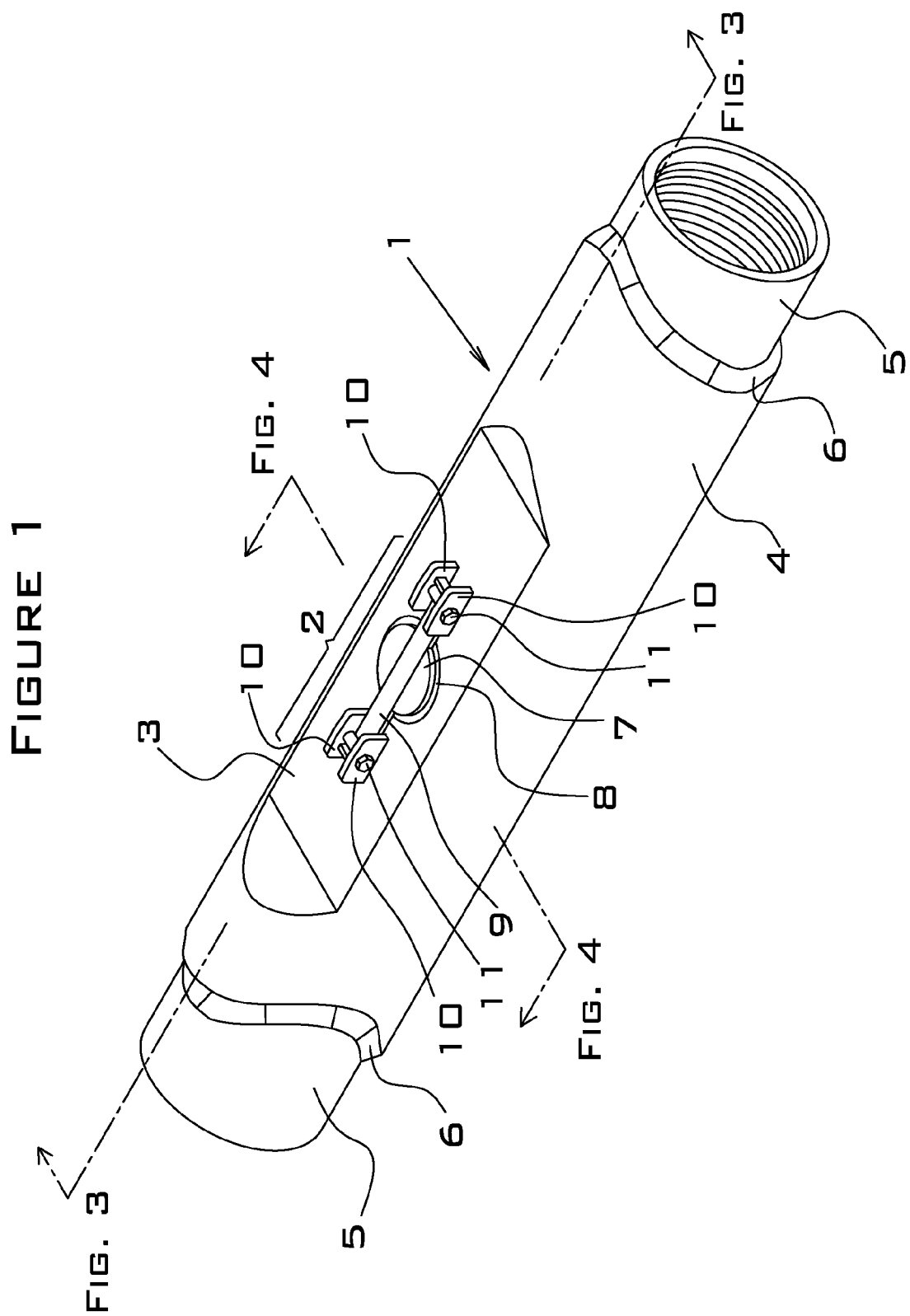
FIG. 1 is an isometric view of the present invention.

1 Production string relief valve, relief valve
2 Valve assembly
3 Support base
4 Housing
5 Pipe coupling
6 Welds
7 Valve element
8 Valve seat
9 Leaf spring
10 Spring retainer brackets
11 Retainer bolts
12 Production string
13 Well casing
14 Subsurface formation
15 Production tubing
16 Annular space within well casing
17 Reinforcement plate

DETAILED DESCRIPTION OF INVENTION

The present invention comprises two identical relief valve assemblies that are mounted on support bases that are welded to opposite sides of the outer wall of a hollow cylindrical housing. The housing comprises female threaded couplings at each end that may be screwed onto the male ends of appropriately sized production tubing. The housing is structurally reinforced by two carved plates that fit against and are welded to the inside walls of the housing. The valve assembly components are preferably manufactured from stainless steel, while the support base, housing, reinforcement plates, and pipe couplings are preferably manufactured from either stainless steel or carbon steel.

Each valve assembly comprises a valve element that is in the shape of a spherical segment, a cylindrical valve seat, and a rectangular (slightly bowed) leaf spring. The leaf spring provides biasing force that pushes the spherical sealing face of the valve element against the circular sealing face of the valve seat to form a fluid-tight seal when the valve is in the normally closed position. The circular sealing face of the valve seat is chamfered to provide a close fit with the spherical sealing face of the valve element. The central portion of the leaf spring is welded into a rectangular groove that is machined into the low-pressure side of the valve element, and each of the spring ends is attached to a pair of brackets that are welded to a support base. Each spring end is rotatably attached to the pair of brackets by a bolt that is positioned over the top of the spring and that is attached across the pair of brackets, each of the two support bases is welded to the perimeter of a cutout in the wall of the housing.

The curvature and thickness of the leaf spring and the elastic modulus of the leaf spring material are selected in combination so that the leaf spring provides a known biasing force on the valve element. The cracking pressure of a relief valve used for a particular application may be set by selecting a particular leaf spring having the required properties to produce the desired biasing force. The cracking pressure for a particular application is determined by the maximum safe operating pressure of the production string components; for example, a production string that produces into a polymer flow line to storage tanks will typically require a lower cracking pressure, while a production string comprising steel flow lines producing into treaters will typically require a higher cracking pressure.

In normal operation, the valve of the present invention remains closed, and production fluid passes longitudinally through the interior of the housing of the present invention and up through the production string to the surface for processing and/or storage. When the fluid pressure in the production string starts to exceed the maximum safe limit due to a blockage or other problem (such as freezing of flow line and valves), the fluid pressure within the interior of the present invention overcomes the biasing force on the valve element. This condition causes the valve to open, allowing fluid to be released from the interior of the present invention though the annular opening between the valve element and the valve seat. This release of production fluid through the valve reduces the excess fluid pressure in the production string.

FIG. 1 is an isometric view of the present invention, which is a production string pressure relief valve 1. Major components of the production string relief valve 1 shown in FIG. 1 include a valve assembly 2 mounted on a support base 3, a housing 4, and two threaded female pipe couplings 5. The couplings 5 are attached to the housing 4 via circumferential welds 6. The valve assembly 2 comprises a valve element 7, a valve seat 8, a biasing leaf spring 9, four spring retainer brackets 10, and two retainer bolts 11. The components of the valve assembly 2 are described in detail in reference to FIGS. 4 through 7.

Figure 2:
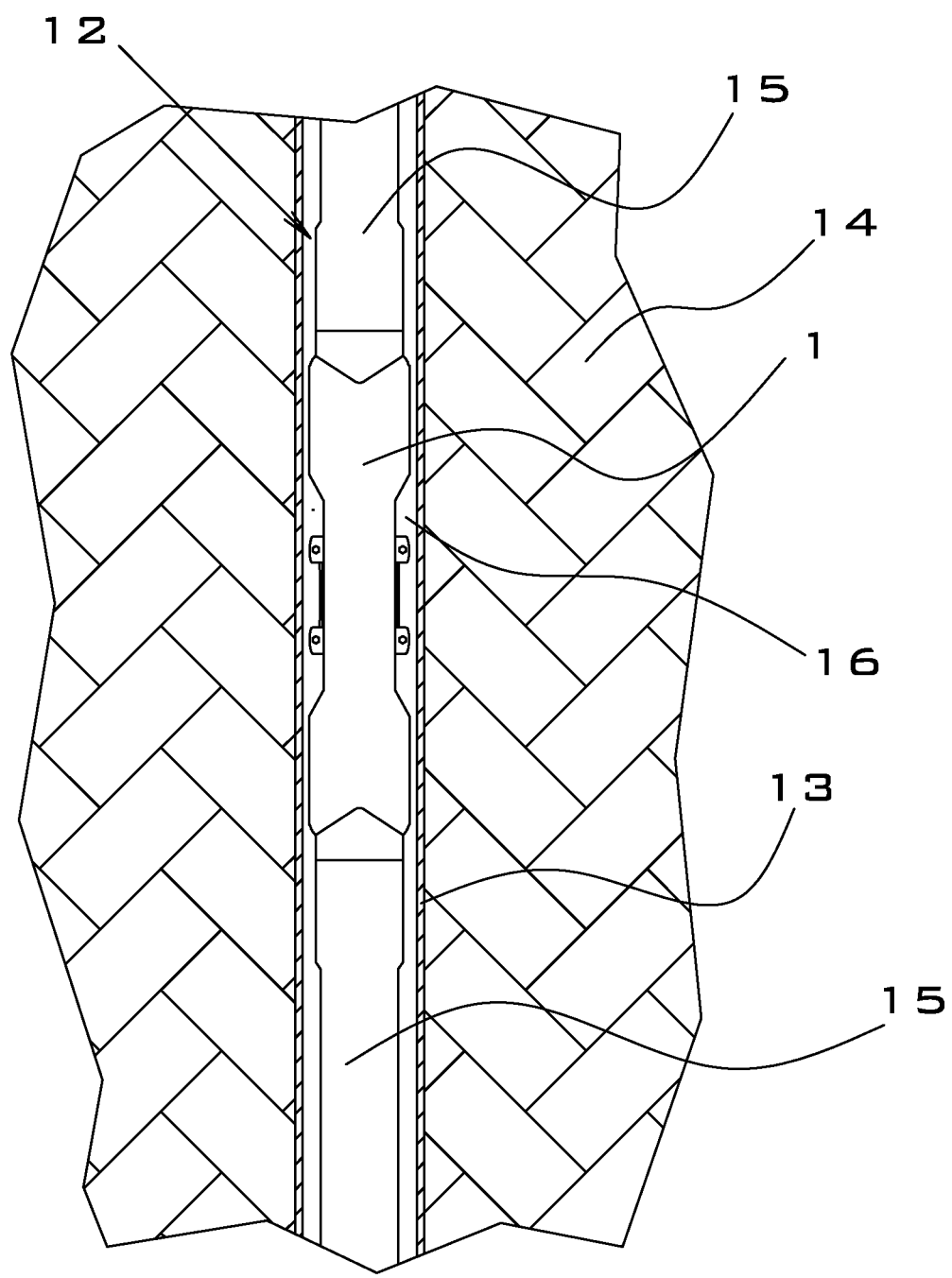
FIG. 2 is a cut-away view of the present invention installed in a production string.

FIG. 2 is a cut-away view illustrating the production string relief valve 1 installed as a component of a production string 12, which is installed within a well casing 13 in a subsurface formation 14. The purpose of the production string 12 is to transport production fluids (e.g., oil, gas, or water) to the surface for processing and/or storage. As shown, the relief valve 1 is installed between two threaded lengths of production tubing 15. The production string 12 typically extends from the surface to the producing zone of the reservoir (not shown). The production string 12 is installed within the annular space 16 of the well casing 13. In practice, the relief valve 1 is typically installed below the first joint of tubing below the surface, which places the relief valve 1 approximately 30 feet below the surface; however, the relief valve 1 may be installed either higher or lower in the production string 12 if desired. If fluid pressure within the production string 12 rises above a preset maximum safe limit, the relief valve 1 will open, thereby allowing a portion of the fluid within the production string 12 to be released to the annular space 16 within the casing 13. The details of the valve operation are described more fully in reference to FIGS. 4 through 7.

The relief valve 1 can be made in a variety of sizes for use with various sizes of production tubing and casings. FIG. 2 illustrates one example of a relief valve 1 that is designed to be used with API 2-⅜-inch upset thread tubing that is installed within four-inch inside-diameter well casing. This example of the relief valve 1 has a maximum outside diameter of 3.5 inches, and a minimum inside diameter of 2.0 inches.

Figure 3:
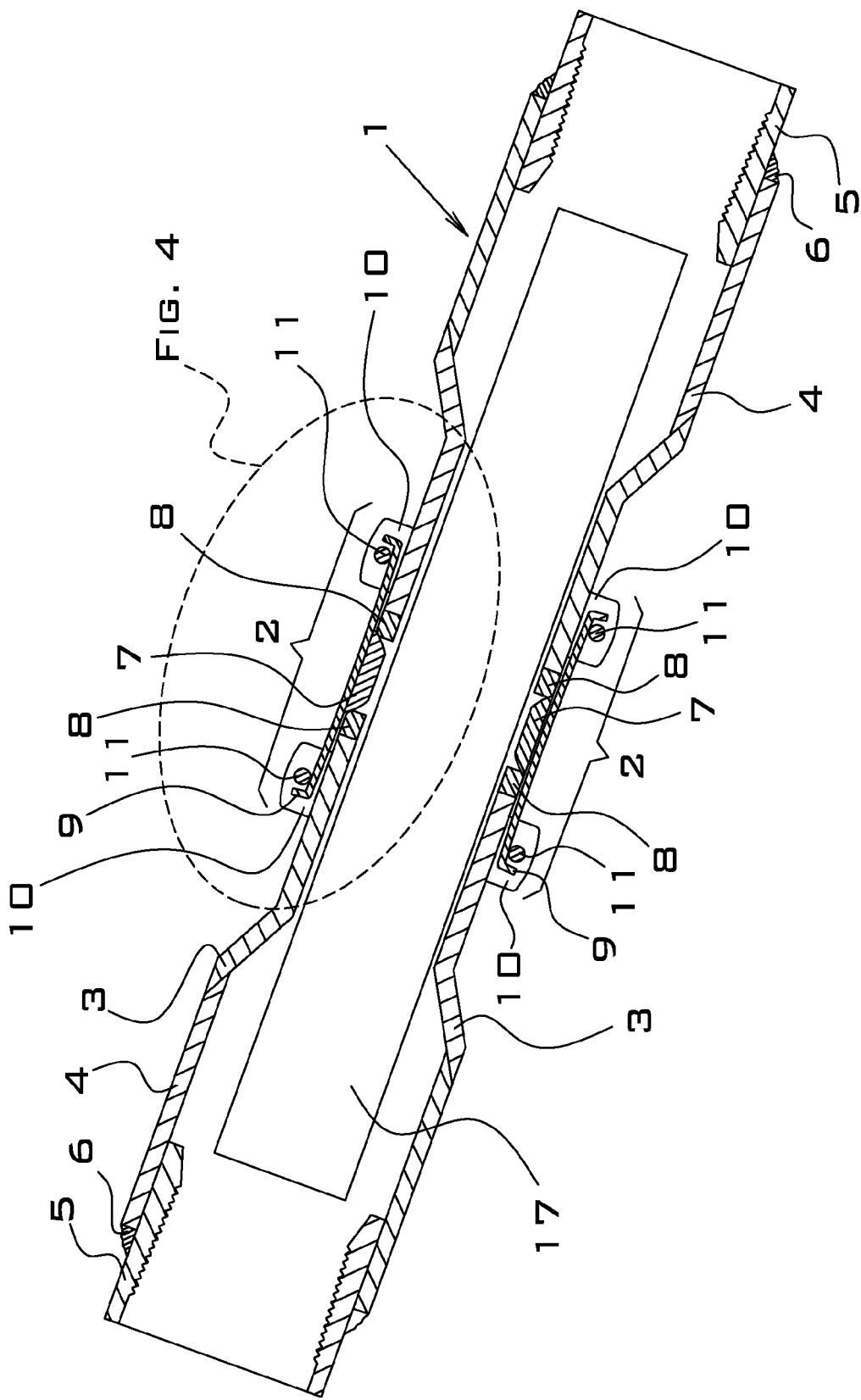
FIG. 3 is a longitudinal cross-section view of the present invention.

FIG. 3 is a longitudinal cross-section view of the production string relief valve 1. As shown, the relief valve 1 comprises two identical valve assemblies 2. The valve assemblies 2 are longitudinally centered along the housing 4 and are mounted on support bases 3 that are located on opposite sides of the housing 4 at 180-degree spacing. The valve seats 8 and brackets 10 are preferably welded to the support base 3. The biasing leaf springs 9 are rotatably connected to the brackets 10 by retainer bolts 11 that screw into a matching pair of brackets 10 at each end of the springs. Each leaf spring 9 has a 90-degree bend at the tip of each end to keep the leaf spring 9 from being popped out of position on the bolts 11 by accidental contact with the well casing or other object. The relief valve 1 comprises two curved internal reinforcement plates 17 that fit against opposite sides of the inside of the housing 4 and are welded in place. The reinforcement plates are positioned at 90 degrees relative to the positions of the valve assemblies 2 on the housing 4, as shown more clearly in FIGS. 6 and 7.

Figure 4:
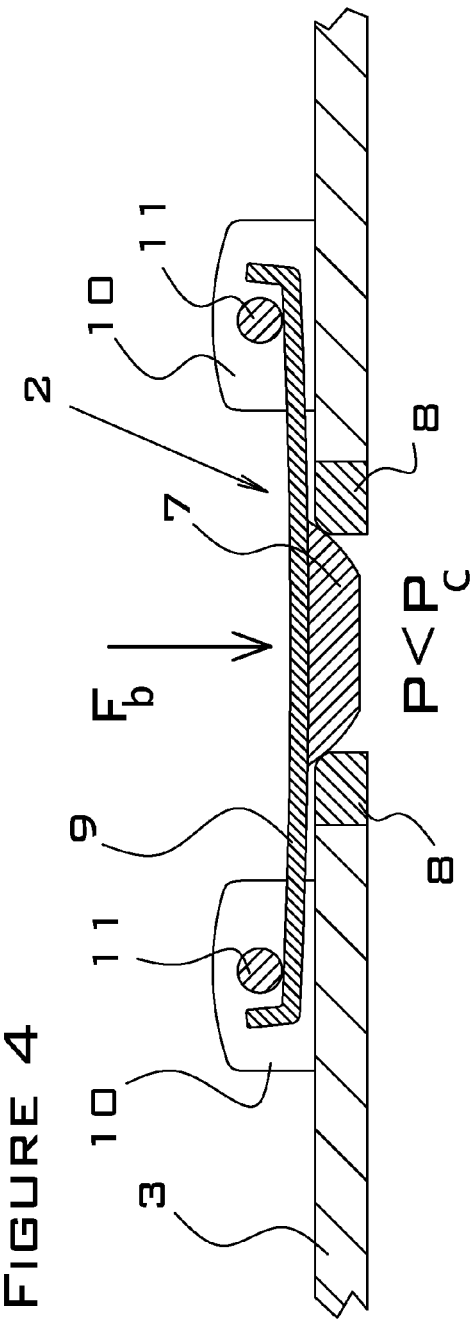
FIG. 4 is a cross-section detail view of the valve assembly of the present invention with the sealing components shown in the normally closed position.

FIG. 4 is a longitudinal cross-section detail of a valve assembly 2 shown in FIG. 3, with the sealing components shown in the normally closed position. As shown, spring tension in the leaf spring 9 causes the valve element to be pushed against the valve seat 8 with a biasing force $F_b$. When internal fluid pressure is within the relief valve is less than the cracking pressure $P_c$ of the valve assembly 2, the spring biasing force $F_b$ is greater than the opening force on the valve produced by the internal pressure P, and the biasing force holds the valve element 7 against the valve seat 8 as shown, thereby producing a fluid-tight seal between the two components 7, 8.

Figure 5:
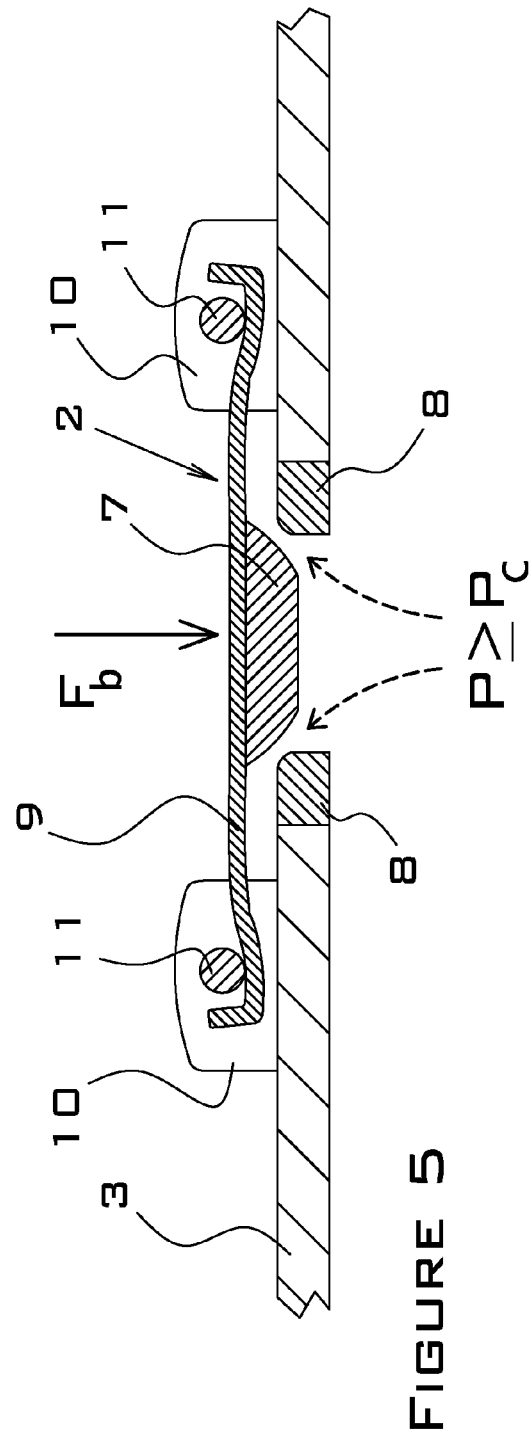
FIG. 5 is a cross-section detail view of the valve assembly of the present invention with the sealing components shown in the open position.

FIG. 5 is a longitudinal cross-section detail of the valve assembly 2 similar to that shown in FIG. 4, except shown with the valve in the open position. In this condition, the internal fluid pressure P is equal to or greater than the cracking pressure $P_c$ of the valve assembly 2. This condition produces an opening force on the valve element 7 that is greater than the biasing force $F_b$, causing the leaf spring 9 to deflect away from the support base 3, and the valve element 7 to lift away from the valve seat 8. Under this condition, fluid inside the relief valve flows through the annular gap between the valve element 7 and the valve seat 8, as illustrated by the dashed arrows. This release of internal fluid causes a drop in the internal fluid pressure P, and the valve will reclose when the internal pressure falls below $P_c$.

FIGS. 4 and 5 illustrate a key difference between the present invention and the invention of Anderson et al. (U.S. Patent Application No. 2013/0312851 A1) that is described in reference to Anderson's FIG. 4 embodiment. Anderson's invention comprises a leaf spring that is fixed to a base support on one end and attached to a valve element on the opposite end; in contrast, the leaf spring of the present invention is attached to base supports at each of the two spring ends and attached to the valve element in the center of the spring, the spring and valve configuration of the present invention is advantageous over the prior art because it provides a biasing force that is directly in line with the axis of the valve element and valve seat thereby promoting a constant sealing force around the perimeter of the sealing surface, as opposed to the force applied by Anderson's cantilever configuration, which may not provide a biasing force that is constant around the perimeter of the sealing surface.

Figure 6:
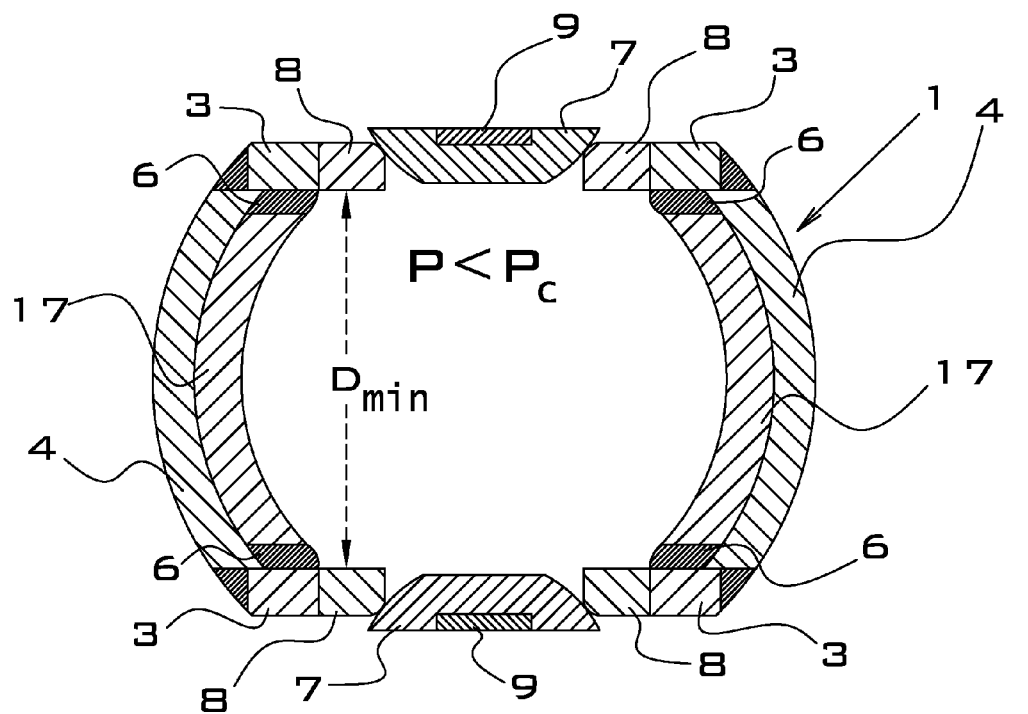
FIG. 6 is an axial cross-section view of the present invention with the sealing components shown in the normally closed position.
Figure 7:
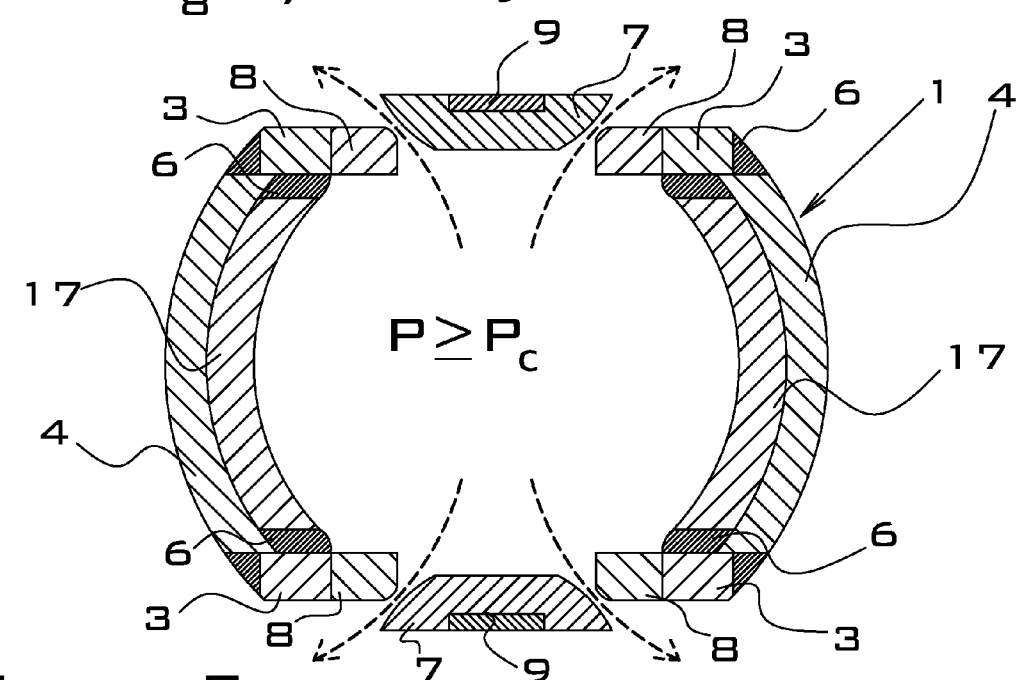
FIG. 7 is an axial cross-section view of present invention with the sealing components shown in the open position.

FIG. 6 is an axial cross-section view of the production string relief valve 1 shown in the normally closed position, with each valve element 7 sealing against its mating valve seat 8. As shown, the sealing contact face of each circular valve seat 8 is chamfered to closely fit with the spherical sealing surface of the mating valve element 7. Two reinforcement plates 1 are attached to the inside of opposing walls of the housing 4 with welds 6. The reinforcement plates 17 add effective wall thickness to the housing 4, thereby increasing the overall tensile and compressive strength of the production string relief valve 1. This thick-wall feature of the present invention is an advantage for some applications over the prior art of Anderson et al., which is designed with relatively thin walls its order to minimize the outside diameter of the device. FIG. 6 also shows the location of the minimum inside diameter (labeled $D_{min}$) of the relief valve 1. For each example size of manufacture of the relief valve 1, the inside diameter is designed to be compatible with devices that are run through the inside of the production string comprising the relief valve 1. For example, a relief valve 1 designed to be used in conjunction with API 2-⅜ upset tubing has a minimum inside diameter of 2.0 inches, and this inside diameter is compatible with bottom hole barrel pumps, swabbing tools, standing valves, sucker rods, and other devices that are designed for use with this size tubing, FIG. 7 is an axial cross-section view of the production string relief valve 1 that is similar to the view shown in FIG. 6, except that the valve components are shown in the open position. As shown, when the internal fluid pressure P exceeds the cracking pressure $P_c$ of the two valves, fluid will escape from the interior of the relief valve 1 (as illustrated by the dashed arrows) between each valve element 7 and its mating valve seat 8, thereby reducing the internal pressure within the relief valve 1. This double-valve configuration increases the total flow rate through the relief valve 1 compared to a single-valve design, and thereby optimizes the effectiveness of the present invention to quickly correct an overpressure condition in the production string.

Although the preferred embodiment of the present invention has been shown and described. It will be apparent to those skilled in the art that many changes and modifications may be made without departing from the invention in its broader aspects. The appended claims are therefore intended to cover all such changes and modifications as fall within the true spirit and scope of the invention.

I claim:

1. A production string pressure relief system comprising:
   (a) a hollow cylindrical housing with an outer wall;
   (b) a first relief valve assembly that is mounted on a first support base that is welded to the outer wall of the housing; and
   (c) a second relief valve assembly that is mounted on a second support base that is welded to the outer wall of the housing directly opposite the first support base;
   wherein each of the first and second relief valve assemblies comprises a valve element that is in the shape of a spherical segment with a spherical sealing face, a cylindrical valve seat with a circular sealing face, and a leaf spring;
   wherein the leaf spring comprises a central portion; and
   wherein the central portion of the leaf spring is welded into a rectangular groove in a low-pressure side of the valve element.

2. The production string pressure relief system of claim 1, wherein the leaf spring provides a biasing force that pushes the spherical sealing face of the valve element against the circular sealing face of the valve seat to form a fluid-tight seal when the valve is in a normally closed position.

3. The production string pressure relief system of claim 1, wherein the sealing face of the valve seat is chamfered to fit with the sealing face of the valve element.

4. The production string pressure relief system of claim 1, wherein the leaf spring comprises a first end and a second end; and wherein each of the first and second ends of the leaf spring is attached to a pair of brackets that are welded to the support base.

5. The production string pressure relief system of claim 4, wherein each of the first and second ends of the leaf spring is rotatably attached to the pair of brackets.

6. The production string pressure relief system of claim 1, wherein the support base is welded to a perimeter of a cutout in the outer wall of the housing.

7. The production string pressure relief system of claim 2, wherein there is an internal fluid pressure within the cylindrical housing; wherein the valve assembly has a cracking pressure; and wherein when the internal fluid pressure is equal to or greater than the cracking pressure of the valve assembly, an opening force is exerted on the valve element that is greater than the biasing force, thereby causing the leaf spring to deflect away from the support base and the valve element to lift away from the valve seat and allowing fluid inside the housing to flow through an annular gap between the valve element and the valve seat.

8. The production string pressure relief valve of claim 1, wherein the hollow cylindrical housing comprises inside walls, and wherein the hollow cylindrical housing is structurally reinforced with two curved plates that fit against and are welded to the inside walls of the housing.

* * * * *